US012695029B2

(12) United States Patent
Aso et al.

(10) Patent No.: US 12,695,029 B2
(45) Date of Patent: Jul. 28, 2026

(54) MULTILAYER CERAMIC CAPACITOR

(71) Applicant: Murata Manufacturing Co., Ltd., Nagaokakyo (JP)

(72) Inventors: Ryota Aso, Nagaokakyo (JP); Daisuke Hamada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 206 days.

(21) Appl. No.: 18/527,439

(22) Filed: Dec. 4, 2023

(65) Prior Publication Data

US 2024/0096553 A1 Mar. 21, 2024

Related U.S. Application Data

(63) Continuation of application No. PCT/JP2022/026743, filed on Jul. 5, 2022.

(30) Foreign Application Priority Data

Jul. 15, 2021 (JP) ................................. 2021-117046

(51) Int. Cl.
| | |
|---|---|
| *H01G 4/012* | (2006.01) |
| *H01G 4/008* | (2006.01) |
| *H01G 4/12* | (2006.01) |
| *H01G 4/30* | (2006.01) |

(52) U.S. Cl.
CPC ........... *H01G 4/012* (2013.01); *H01G 4/0085* (2013.01); *H01G 4/1227* (2013.01); *H01G 4/1245* (2013.01); *H01G 4/30* (2013.01)

(58) Field of Classification Search
CPC .... H01G 4/012; H01G 4/0085; H01G 4/1227; H01G 4/1245; H01G 4/30
See application file for complete search history.

(56) References Cited

U.S. PATENT DOCUMENTS

| | | | |
|---|---|---|---|
| 2004/0179326 A1 | 9/2004 | Hattori | |
| 2013/0038982 A1 | 2/2013 | Lee et al. | |
| 2014/0104748 A1* | 4/2014 | Park ......................... | H01G 4/01 |
| | | | 156/89.12 |
| 2016/0093443 A1* | 3/2016 | Hirao ..................... | H01G 4/232 |
| | | | 427/79 |
| 2017/0125167 A1* | 5/2017 | Kawakami ............. | H01G 4/236 |
| 2019/0214195 A1* | 7/2019 | Gustafson ............ | H01G 4/1227 |
| 2020/0066454 A1* | 2/2020 | Cha ...................... | H01G 4/0085 |

(Continued)

FOREIGN PATENT DOCUMENTS

| | | |
|---|---|---|
| JP | 52136354 A | 11/1977 |
| JP | 2001217137 A | 8/2001 |

(Continued)

OTHER PUBLICATIONS

International Search Report in PCT/JP2022/026743, mailed Sep. 20, 2022, 3 pages.

(Continued)

*Primary Examiner* — Michael P Mcfadden
(74) *Attorney, Agent, or Firm* — Keating & Bennett, LLP

(57) ABSTRACT

A multilayer ceramic capacitor includes dielectric layers and inner electrode layers stacked and each made of a ceramic material. Each of the inner electrode layers includes through holes. An average circularity of the through holes is equal to or greater than to about 0.6.

19 Claims, 16 Drawing Sheets

30(31, 32)

30H

30H

30H

30H

30H

5 μm

(56)  References Cited

U.S. PATENT DOCUMENTS

| | | | | |
|---|---|---|---|---|
| 2020/0135400 A1* | 4/2020 | Sakurai | ................. | H01G 4/232 |
| 2021/0210257 A1* | 7/2021 | Hofstätter | ............ | H01C 1/1413 |
| 2022/0208470 A1* | 6/2022 | Lee | ........................ | H01G 2/065 |

FOREIGN PATENT DOCUMENTS

| | | | |
|---|---|---|---|
| JP | 2004273975 A | 9/2004 |
| JP | 2013042110 A | 2/2013 |
| JP | 2016072484 A | 5/2016 |

OTHER PUBLICATIONS

Written Opinion in PCT/JP2022/026743, mailed Sep. 20, 2022, 3 pages.

* cited by examiner

MULTILAYER CERAMIC CAPACITOR

CROSS REFERENCE TO RELATED APPLICATIONS

This application claims the benefit of priority to Japanese Patent Application No. 2021-117046 filed on Jul. 15, 2021 and is a Continuation application of PCT Application No. PCT/JP2022/026743 filed on Jul. 5, 2022. The entire contents of each application are hereby incorporated herein by reference.

BACKGROUND OF THE INVENTION

1. Field of the Invention

The present invention relates to multilayer ceramic capacitors.

2. Description of the Related Art

There is a known multilayer ceramic capacitor including a plurality of dielectric layers and a plurality of inner electrode layers, the plurality of dielectric layers and the plurality of inner electrode layers being stacked and each made of a ceramic material. Such a multilayer ceramic capacitor has been demanded to be smaller, have higher capacitance, and have improved reliability. Therefore, reducing the thickness of each of the dielectric layers, reducing the thickness of each of the inner electrode layers, and increasing the number of stacked layers have been attempted.

Japanese Unexamined Patent Application Publication No. 2013-42110 discloses a problem in which a short circuit failure between inner electrode layers occurs when the thickness of each of dielectric layers is reduced. In addition, Japanese Unexamined Patent Application Publication No. 2013-42110 discloses an invention that includes an electrically conductive layer between the inner electrode layers to overcome this problem and suppress a decrease of reliability.

Meanwhile, when the thickness of each of inner electrode layers is reduced, a plurality of through holes are formed in each of the inner electrode layers. When through holes are formed in each of inner electrode layers, the lifetime, in other words, reliability of a multilayer ceramic capacitor may decrease.

SUMMARY OF THE INVENTION

Preferred embodiments of the present invention provide multilayer ceramic capacitors that each reduce or prevent a decrease of reliability.

The inventors of preferred embodiments of the present application have discovered that the lifetime of a multilayer ceramic capacitor depends on the circularity of each of the through holes of the inner electrode layers. Specifically, when the circularity of each of the through holes is low, in other words, when the shape of each of the through holes is a shape with large irregularities, concentration of an electric field occurs at the large irregularities, and as a result, the lifetime, in other words, the reliability of the multilayer ceramic capacitor decreases. Meanwhile, when the circularity of each of the through holes is high, in other words, when the shape of each of the through holes is a shape with small or no irregularities, concentration of an electric field is reduced or prevented, and, as a result, a decrease of the lifetime, in other words, the reliability of the multilayer ceramic capacitor is reduced or prevented.

A multilayer ceramic capacitor according to a preferred embodiment of the present invention includes a plurality of dielectric layers and a plurality of inner electrode layers being stacked and each made of a ceramic material. Each of the plurality of inner electrode layers includes a plurality of through holes. An average circularity of the plurality of through holes is equal to or greater than about 0.6.

According to preferred embodiments of the present invention, it is possible to reduce or prevent a decrease of the reliability of a multilayer ceramic capacitor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
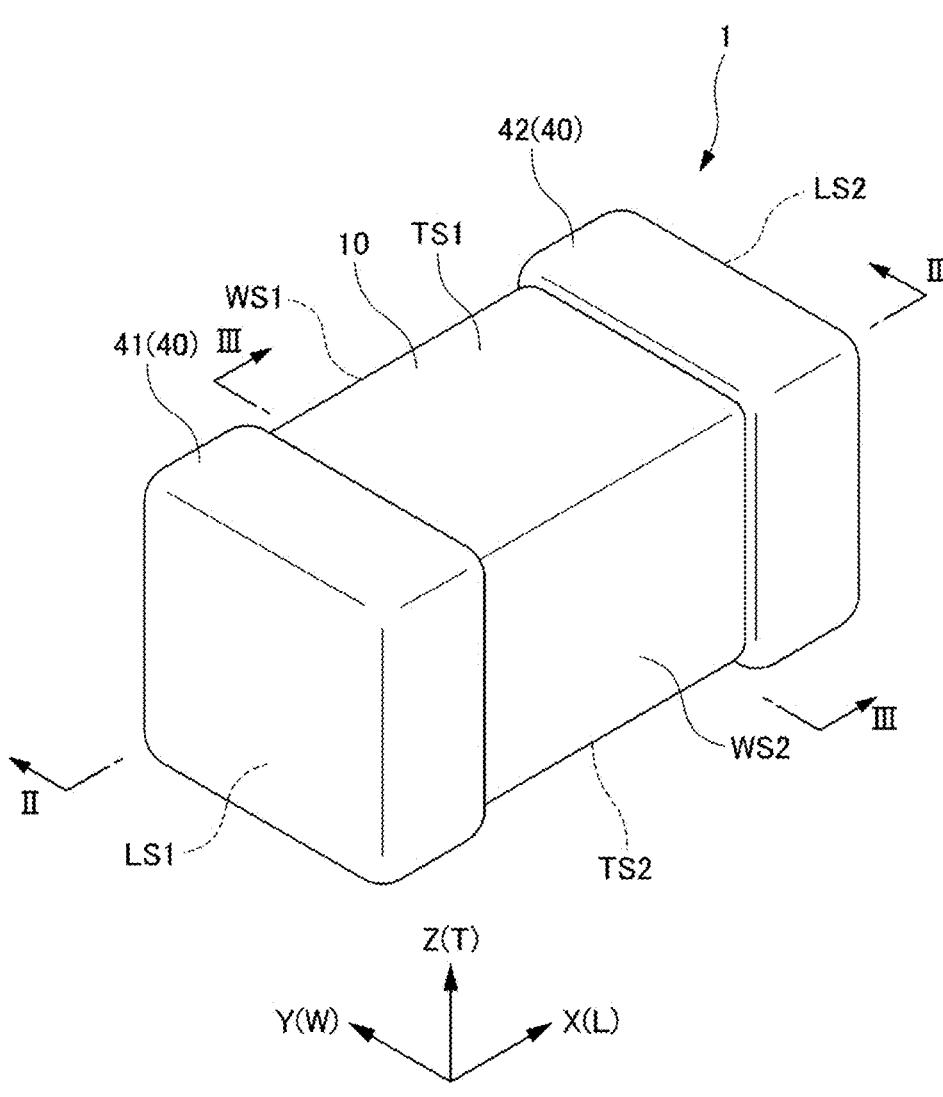
FIG. 1 is a perspective view illustrating a multilayer ceramic capacitor according to a preferred embodiment of the present invention.

Hereinafter, preferred embodiments of the present invention will be described with reference to the attached drawings. Components the same as or corresponding to each other are denoted by the same reference signs in the drawings.

Multilayer Ceramic Capacitor

Figure 2:
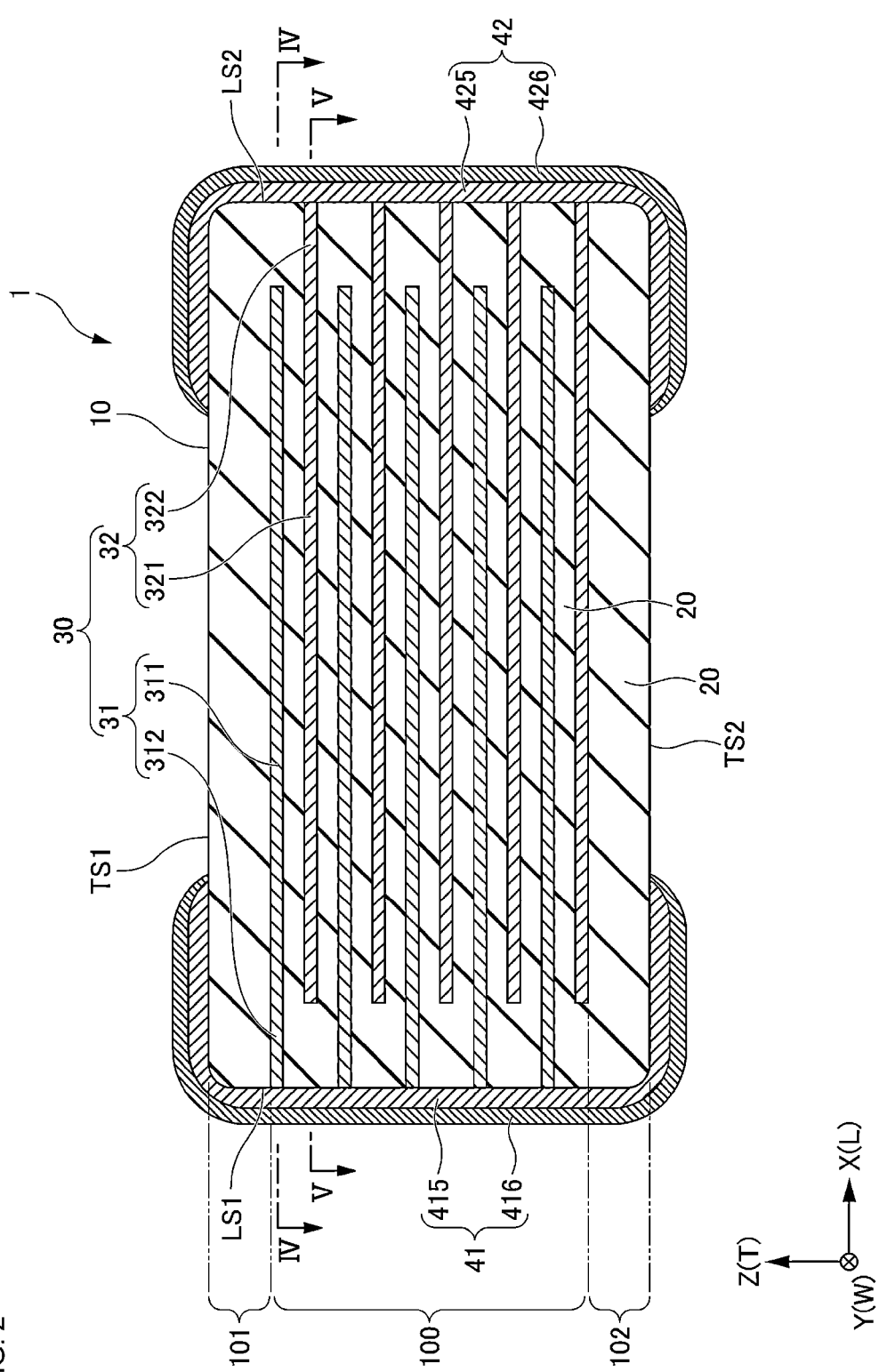
FIG. 2 is a II-II-line sectional view (LT cross-section) of the multilayer ceramic capacitor illustrated in FIG. 1.
Figure 3:
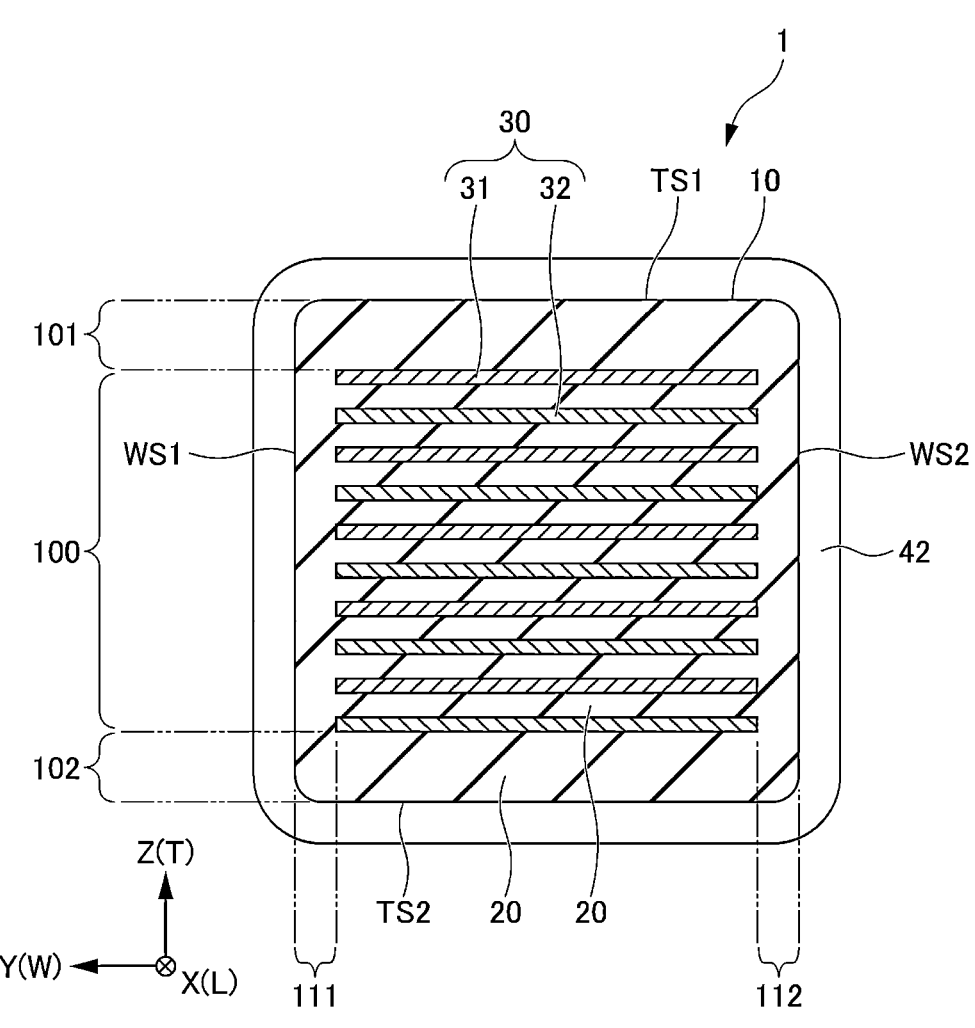
FIG. 3 is a sectional view (WT cross-section) of the multilayer ceramic capacitor illustrated in FIG. 1.
Figure 4:
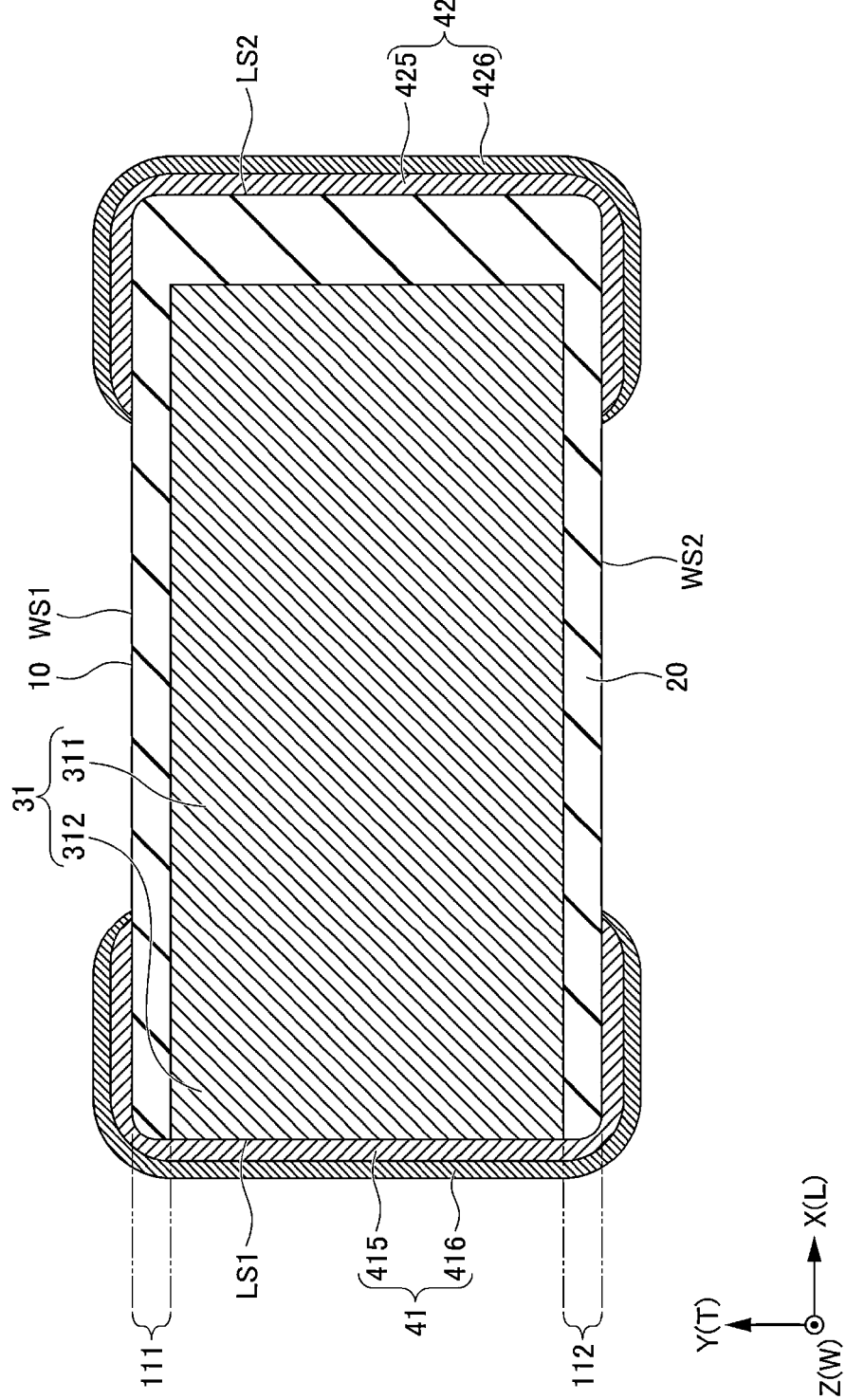
FIG. 4 is a IV-IV-line sectional view (LW cross-section) of the multilayer ceramic capacitor illustrated in FIG. 2.
Figure 5:
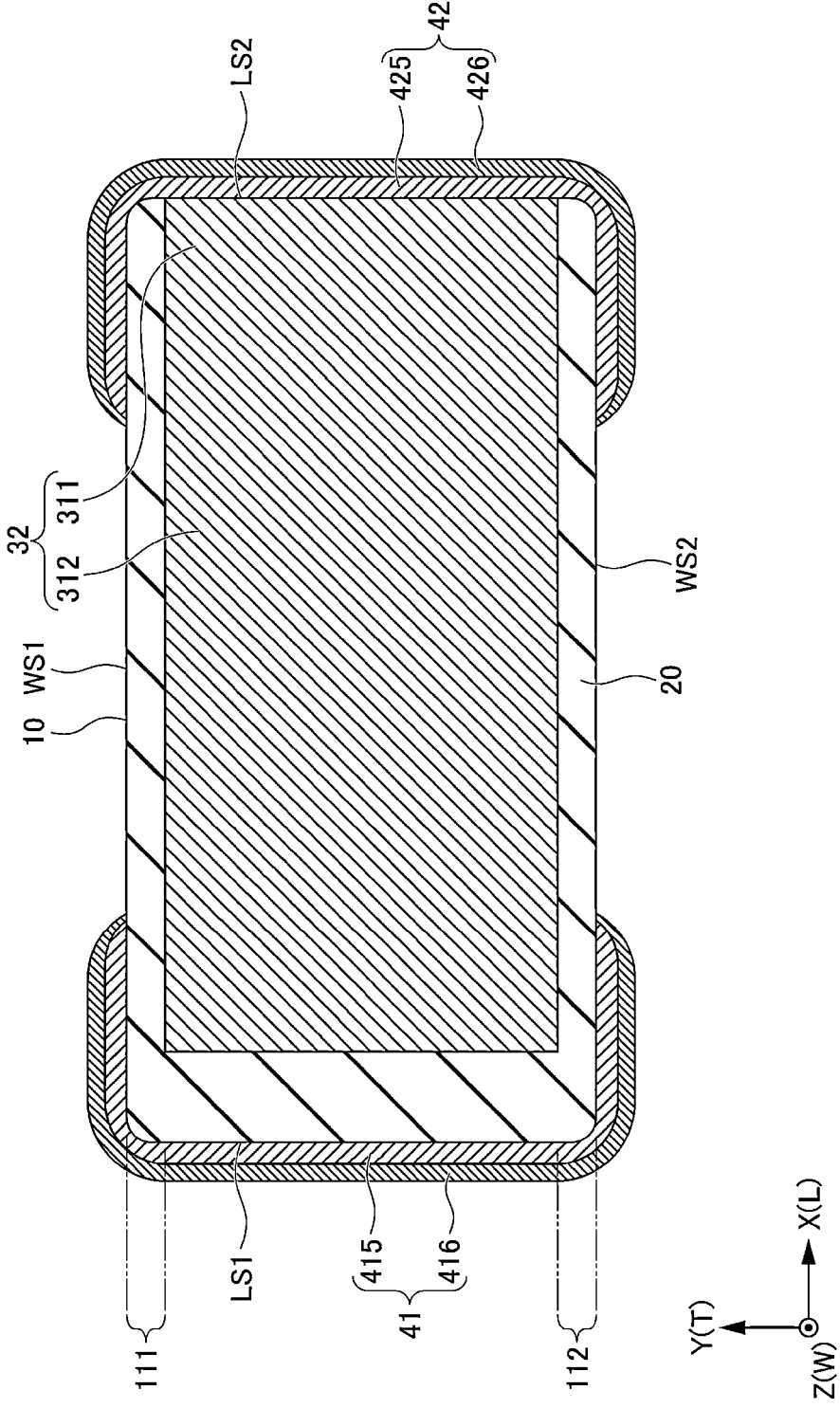
FIG. 5 is a V-V-line sectional view (LW cross-section) of the multilayer ceramic capacitor illustrated in FIG. 2.

FIG. 1 is a perspective view illustrating a multilayer ceramic capacitor according to a preferred embodiment of the present invention, FIG. 2 is a II-II-line sectional view of the multilayer ceramic capacitor illustrated in FIG. 1, and FIG. 3 is a sectional view of the multilayer ceramic capacitor illustrated in FIG. 1 FIG. 4 is a IV-IV-line sectional view of the multilayer ceramic capacitor illustrated in FIG. 2, and FIG. 5 is a V-V-line sectional view of the multilayer ceramic capacitor illustrated in FIG. 2. A multilayer ceramic capacitor 1 illustrated in FIG. 1 to FIG. 5 includes a multilayer body 10 and an outer electrode 40.

In each of FIG. 1 to FIG. 5, an XYZ rectangular coordinate system is illustrated. The X-direction is a length direction L of the multilayer ceramic capacitor 1 and the multilayer body 10, the Y-direction is a width direction W of the multilayer ceramic capacitor 1 and the multilayer body 10, and the Z-direction is a stacking direction T of the multilayer ceramic capacitor 1 and the multilayer body 10. Thus, the cross-section illustrated in FIG. 2 is also referred to as the LT cross-section, and the cross-section illustrated in FIG. 3 is also referred to as the WT cross-section. In addition, the cross-sections illustrated in FIG. 4 and FIG. 5 are also each referred to as the LW cross-section.

The length direction L, the width direction W, and the stacking direction T do not necessarily have a relationship of being orthogonal or substantially orthogonal to each other and may have a relationship of intersecting each other.

The multilayer body 10 has a rectangular or substantially rectangular parallelepiped shape and includes a first main surface TS1 and a second main surface TS2 that face each other in the stacking direction T, a first side surface WS1 and a second side surface WS2 that face each other in the width direction W, and a first end surface LS1 and a second end surface LS2 that face each other in the length direction L.

Corner portions and ridge portions of the multilayer body 10 are preferably rounded. The corner portions are each a portion at which three surfaces of the multilayer body 10 meet each other, and the ridge portions are each a portion at which two surfaces of the multilayer body 10 meet each other.

As illustrated in FIG. 2 and FIG. 3, the multilayer body 10 includes a plurality of dielectric layers 20 and a plurality of inner electrode layers 30, the plurality of dielectric layers 20 and the plurality of inner electrode layers 30 being stacked in the stacking direction T. In addition, the multilayer body 10 includes an inner layer portion 100, and a first outer layer portion 101 and a second outer layer portion 102 that are provided such that the inner layer portion 100 is located therebetween in the stacking direction T.

The inner layer portion 100 includes a portion of the plurality of dielectric layers 20 and the plurality of inner electrode layers 30. In the inner layer portion 100, the plurality of inner electrode layers 30 face each other with the dielectric layers 20 interposed therebetween. The inner layer portion 100 is a portion that generates an electrostatic capacity and substantially defines and functions as a capacitor.

The first outer layer portion 101 is provided at the side of the first main surface TS1 of the multilayer body 10, and the second outer layer portion 102 is provided at the side of the second main surface TS2 of the multilayer body 10. More specifically, the first outer layer portion 101 is located between the first main surface TS1 and, among the plurality of inner electrode layers 30, the inner electrode layer 30 that is closest to the first main surface TS1, and the second outer layer portion 102 is located between the second main surface TS2 and, among the plurality of inner electrode layers 30, the inner electrode layer 30 that is closest to the second main surface TS2. The first outer layer portion 101 and the second outer layer portion 102 do not include the inner electrode layers 30 and each include a portion of the plurality of dielectric layers 20, the portion being other than a portion for the inner layer portion 100. The first outer layer portion 101 and the second outer layer portion 102 are each a portion that defines and functions as a protective layer of the inner layer portion 100.

In addition, as illustrated in FIG. 3, the multilayer body 10 includes a first side-surface-side outer layer portion 111 and a second side-surface-side outer layer portion 112 that are provided such that the inner electrode layers 30 are located therebetween in the width direction W. The first side-surface-side outer layer portion 111 is positioned at the side of the first side surface WS1 of the multilayer body 10, and the second side-surface-side outer layer portion 112 is positioned at the side of the second side surface WS2 of the multilayer body 10. More specifically, the first side-surface-side outer layer portion 111 is positioned between the first side surface WS1 and ends of the inner electrode layers 30 at the side of the first side surface WS1, and the second side-surface-side outer layer portion 112 is positioned between the second side surface WS2 and ends of the inner electrode layers 30 at the side of the second side surface WS2. The first side-surface-side outer layer portion 111 and the second side-surface-side outer layer portion 112 do not include the inner electrode layers 30 and include only the plurality of dielectric layers 20. The first side-surface-side outer layer portion 111 and the second side-surface-side outer layer portion 112 are each a portion that defines and functions as a protective layer of the inner electrode layers 30. The first side-surface-side outer layer portion 111 and the second side-surface-side outer layer portion 112 are also each referred to as a W gap or a side gap.

As a material of the dielectric layers 20, for example, dielectric ceramic that includes, as a primary component, $BaTiO_3$, $CaTiO_3$, $SrTiO_3$, $CaZrO_3$, or the like is usable. In addition, as a material of the dielectric layers 20, for example, a Mn chemical compound, a Fe chemical compound, a Cr chemical compound, a Co chemical compound, a Ni chemical compound, or the like may be added as a secondary component. In addition, as a material of the dielectric layers 20, for example, Si may be included as a secondary component and Mg may be included as a secondary component.

The thickness of each of the dielectric layers 20 is not particularly limited and may be, for example, equal to or greater than about 0.2 μm and less than or equal to about 1.0 μm, preferably, equal to or greater than about 0.3 μm and less than or equal to about 0.5 μm. The number of the dielectric layers 20 is not particularly limited and may be, for example, equal to or greater than 15 and less than or equal to 700. The number of the dielectric layers 20 is the total of the number of the dielectric layers in the inner layer portion and the number of the dielectric layers in the outer layer portions.

As illustrated in FIG. 2 to FIG. 5, the plurality of inner electrode layers 30 include a plurality of first inner electrode layers 31 and a plurality of second inner electrode layers 32. The plurality of first inner electrode layers 31 and the plurality of second inner electrode layers 32 are alternately provided in the stacking direction T of the multilayer body 10.

The first inner electrode layers 31 each include a facing electrode portion 311 and an extended electrode portion 312, and the second inner electrode layers 32 each include a facing electrode portion 321 and an extended electrode portion 322.

The facing electrode portion 311 and the facing electrode portion 321 face each other in the stacking direction T of the multilayer body 10 with the dielectric layers 20 interposed therebetween. The shape of each of the facing electrode portion 311 and the facing electrode portion 321 is not particularly limited and may be, for example, a rectangular or substantially rectangular shape. The facing electrode portion 311 and the facing electrode portion 321 are each a portion that generates an electrostatic capacity and that substantially defines and functions as a capacitor.

The extended electrode portion 312 extends from the facing electrode portion 311 toward the first end surface LS1 of the multilayer body 10 and is exposed at the first end surface LS1. The extended electrode portion 322 extends from the facing electrode portion 321 toward the second end surface LS2 of the multilayer body 10 and is exposed at the second end surface LS2. The shape of each of the extended electrode portion 312 and the extended electrode portion 322 is not particularly limited and may be, for example, a rectangular or substantially rectangular shape.

The first inner electrode layers 31 and the second inner electrode layers 32 each include, for example, a metal Ni as a primary component. In addition, each of the first inner electrode layers 31 and the second inner electrode layers 32 may include, as a primary component or as a component other than a primary component, at least one selected from, for example, metals including Cu, Ag, Pd, Au, and the like or alloys including a Ag—Pd alloy and the like each including at least one of these metals. In addition, for example, Sn may be mixed as a solid in a portion of the first inner electrode layers 31 and a portion of the second inner electrode layers 32. Further, each of the first inner electrode layers 31 and the second inner electrode layers 32 may include, for example, as a component other than a primary component, grains of a dielectric that is based on a composition the same as the composition of the ceramic included in the dielectric layers 20. It is determined in the present description that a metal of a primary component is a metal component with a highest wt percent.

The thickness of each of the first inner electrode layers 31 and the second inner electrode layers 32 is not particularly limited and may be, for example, equal to or greater than about 0.2 μm and less than or equal to about 2.0 μm. The number of the first inner electrode layers 31 and the number of the second inner electrode layers 32 are not particularly limited and may be each, for example, equal to or greater than 15 and less than or equal to 700.

The dimensions of the multilayer body 10 are not particularly limited, and the multilayer body 10 may have, for example, dimensions in which the length L1 in the length direction L is equal to or greater than about 0.1 mm and less than or equal to about 32 mm, the width W1 in the width direction W is equal to or greater than about 0.05 mm and less than or equal to about 25 mm, and a thickness T1 in the stacking direction T is equal to or greater than about 0.05 mm and less than or equal to about 32 mm, preferably dimensions in which the length L1 in the length direction L is equal to or greater than about 0.1 mm and less than or equal to about 1.2 mm, the width W1 in the width direction W is equal to or greater than about 0.1 mm and less than or equal to about 0.7 mm, and the thickness T1 in the stacking direction T is equal to or greater than about 0.1 mm and less than or equal to about 0.7 mm, and even more preferably dimensions in which the length L1 in the length direction L is equal to or greater than about 0.2 mm and less than or equal to about 0.5 mm, the width W1 in the width direction W is equal to or greater than about 0.1 mm and less than or equal to about 0.3 mm, and the thickness T1 in the stacking direction T is equal to or greater than about 0.1 mm and less than or equal to about 0.3 mm. In addition, the thickness of each of the first outer layer portion 101 and the second outer layer portion 102 of the multilayer body 10 is not particularly limited and may be equal to or greater than about 0.2 μm and less than or equal to about 40 μm, preferably, equal to or greater than about 0.5 μm and less than or equal to about 20 μm.

The outer electrode 40 includes a first outer electrode 41 and a second outer electrode 42.

The first outer electrode 41 is disposed at the first end surface LS1 of the multilayer body 10 and is connected to the first inner electrode layers 31. The first outer electrode 41 may extend from the first end surface LS1 to a portion of the first main surface TS1 and a portion of the second main surface TS2. In addition, the first outer electrode 41 may extend from the first end surface LS1 to a portion of the first side surface WS1 and a portion of the second side surface WS2.

The second outer electrode 42 is disposed at the second end surface LS2 of the multilayer body 10 and is connected to the second inner electrode layers 32. The second outer electrode 42 may extend from the second end surface LS2 to a portion of the first main surface TS1 and a portion of the second main surface TS2. In addition, the second outer electrode 42 may extend from the second end surface LS2 to a portion of the first side surface WS1 and a portion of the second side surface WS2.

The first outer electrode 41 includes a first base electrode layer 415 and a first plating layer 416, and the second outer electrode 42 includes a second base electrode layer 425 and a second plating layer 426.

The first base electrode layer 415 and the second base electrode layer 425 may each be, for example, a fired layer that includes metal and glass. An example of the glass is a glass component that includes at least one selected from B, Si, Ba, Mg, Al, Li, and the like. As a specific example, borosilicate glass is usable. As the metal, Cu is included as a primary component. In addition, as the metal, at least one selected from, for example, metals including Ni, Ag, Pd, Au, and the like or alloys including a Ag—Pd alloy and the like may be included as a primary component and may be included as a component other than a primary component.

The fired layer is a layer that is obtained by applying an electrically conductive paste including metal and glass to a multilayer body by a dip method and firing the multilayer body. The firing may be performed after firing of the inner electrode layers or the firing may be performed at the same time with firing of the inner electrode layers. In addition, the fired layer may include a plurality of layers.

Alternatively, the first base electrode layer 415 and the second base electrode layer 425 may each be, for example, a resin layer that includes electrically conductive grains and a heat-curable resin. The resin layer may be formed on the above-described fired layer and may be formed on the multilayer body directly without formation of the fired layer.

The resin layer is a layer that is obtained by applying an electrically conductive paste that includes electrically conductive grains and a heat-curable resin to a multilayer body by an application method and firing the multilayer body. The firing may be performed after firing of the inner electrode layers or the firing may be performed at the same time with firing of the inner electrode layers. In addition, the resin layer may include a plurality of layers.

The thickness of each of the first base electrode layer 415 and the second base electrode layer 425 as the fired layer or the resin layer is not particularly limited and may be, for example, equal to or greater than about 1 μm and less than or equal to about 10 μm.

Alternatively, the first base electrode layer 415 and second base electrode layer 425 may each be a thin film layer that is formed by a thin-film formation method such as, for example, a sputtering method or a vapor deposition method and that has a thickness of less than or equal to about 1 μm and includes deposited metal grains.

The first plating layer 416 covers at least a portion of the first base electrode layer 415, and the second plating layer 426 covers at least a portion of the second base electrode layer 425. As the first plating layer 416 and the second plating layer 426, for example, at least one selected from metals including Cu, Ni, Ag, Pd, Au, and the like or alloys including a Ag—Pd alloy and the like may be included.

Each of the first plating layer 416 and the second plating layer 426 may include a plurality of layers. A two-layer structure including, for example, a Ni plating layer and a Sn plating layer is preferable. The Ni plating layer can prevent a base electrode layer from being eroded by solder to mount a ceramic electronic component, and the Sn plating layer can improve wettability of solder to mount a ceramic electronic component and ease the mounting.

The thickness of each of the first plating layer 416 and the second plating layer 426 is not particularly limited and may be, for example, equal to or greater than about 1 μm and less than or equal to about 10 μm.

Inner Electrode Layer

Figure 6:
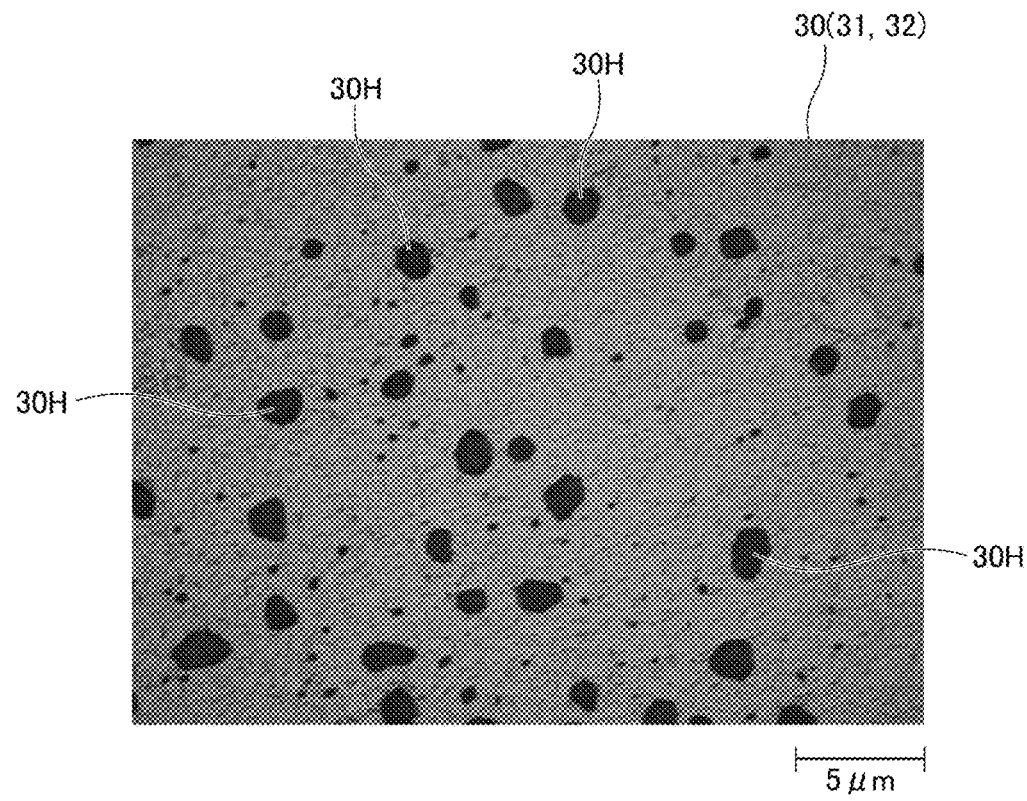
FIG. 6 is an enlarged view in which an inner electrode layer of a multilayer ceramic capacitor according to a preferred embodiment of the present invention is viewed in a stacking direction.

Next, the inner electrode layers 30, in other words, the first inner electrode layers 31 and the second inner electrode layers 32 will be described further. FIG. 6 is an enlarged view of an inner electrode layer viewed in the stacking direction. As illustrated in FIG. 6, the inner electrode layers 30, in other words, the first inner electrode layers 31 and the second inner electrode layers 32 each include a plurality of through holes 30H. Circularity of each of these through holes 30H is high. The circularity is a value that is expressed by the following publicly known formula.

$$\text{Circularity} = \{4 \times \pi \times (\text{area})\} / \{(\text{peripheral length})^2\}$$

In other words, "circularity is high" means, graphically, being a shape without large irregularities, in other words, irregularities having acute angles.

Specifically, the average circularity of the plurality of through holes 30H is, for example, equal to or greater than about 0.6. Consequently, concentration of an electric field can be reduced or prevented at the through holes 30H, and a decrease of the lifetime, in other words, the reliability of the multilayer ceramic capacitor 1 can be reduced or prevented.

Although not particularly limited, one example of a method of obtaining the average circularity of the through holes 30H of the inner electrode layers 30 is, for example, the following method.

In the vicinity of the center in the stacking direction T of the multilayer body 10, the dielectric layers 20 are electrolytically peeled from a desired one of the inner electrode layers 30. A peeled portion in the stacking direction T of the multilayer body 10 is not limited thereto.

By using a metal microscope, for example, a 100× objective lens, three visual fields each having a size of, for example, about 30 μm×about 30 μm are imaged in the vicinity of the center in a plane of the desired inner electrode layer 30. Imaged portions in the plane of the inner electrode layer 30 and the sizes of the visual fields are not limited thereto.

The imaged images are subjected to binarization image processing to be converted into a region in which the inner electrode layers 30 are present and a region in which the inner electrode layers 30 are not present, in other words, a region of the inner electrode layers 30 and a region of the through holes 30H.

In the binarized images, the circularity of each of the through holes 30H is calculated by the above-described formula, the circularity of all of the through holes 30H is averaged in each of the visual fields, and an average circularity is obtained by further averaging the circularity in the three visual fields. In other words, the average value of the circularity of the through holes 30H in the three visual fields in the desired inner electrode layer 30 is considered as the average circularity of the through holes 30H of the plurality of inner electrode layers 30 of the multilayer ceramic capacitor 1.

In addition, in the plurality of through holes 30H, the percentage, in other words, the quantity percentage or the existence percentage, that is, the existence probability of the through holes 30H with circularity equal to or greater than about 0.6 is preferably, for example, equal to or greater than about 60%. In the plurality of through holes 30H, the percentage of the through holes 30H with circularity equal to or greater than about 0.6 is preferably, for example, equal to or greater than about 70%. Consequently, it is possible to further reduce or prevent concentrating of an electric field at the through holes 30H and to further reduce or prevent a decrease of the lifetime, in other words, the reliability of the multilayer ceramic capacitor 1.

Although not particularly limited, one example of a method of obtaining the percentage of the through holes 30H of the inner electrode layers 30 is, for example, the following method.

As described above, in the binarized images, the circularity of each of the through holes 30H is calculated by the above-described formula.

The percentage of the number of the through holes 30H with circularity is, for example, equal to or greater than about 0.6 with respect to the number of all of the through holes 30H in the above-described three visual fields is calculated. In other words, the percentage of the through holes 30H in the three visual fields of the desired inner electrode layer 30 is considered as the percentage of the through holes 30H of the plurality of inner electrode layers 30 of the multilayer ceramic capacitor 1.

Figure 7A:
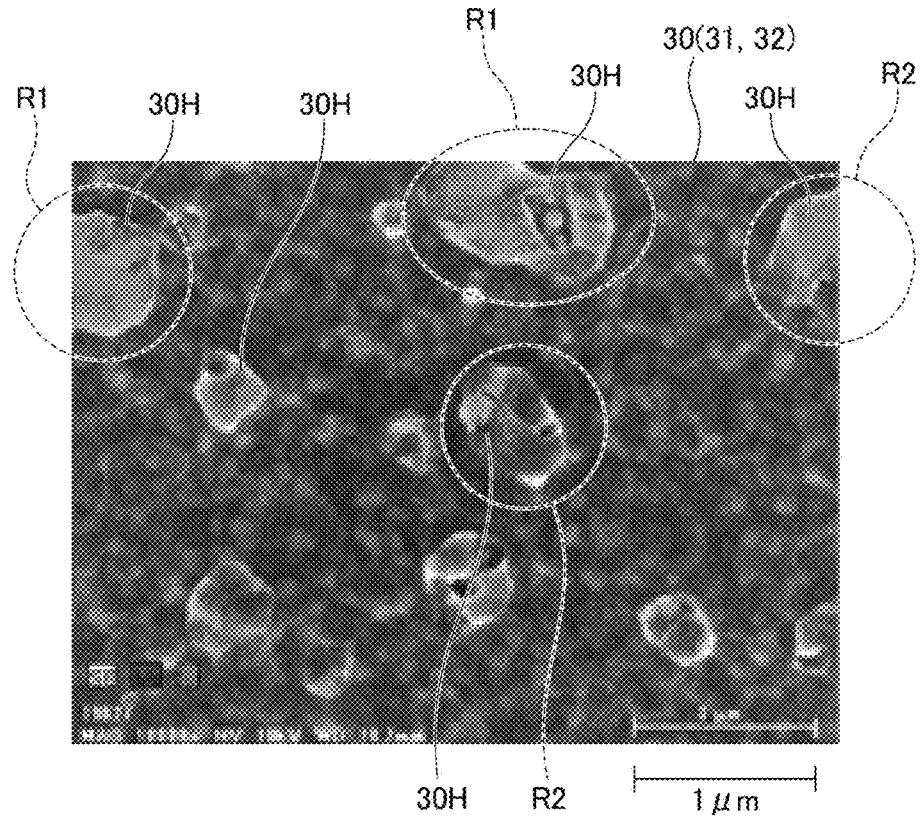
FIG. 7A is one example of an image of an inner electrode layer imaged by a SEM-EDX.
Figure 7B:
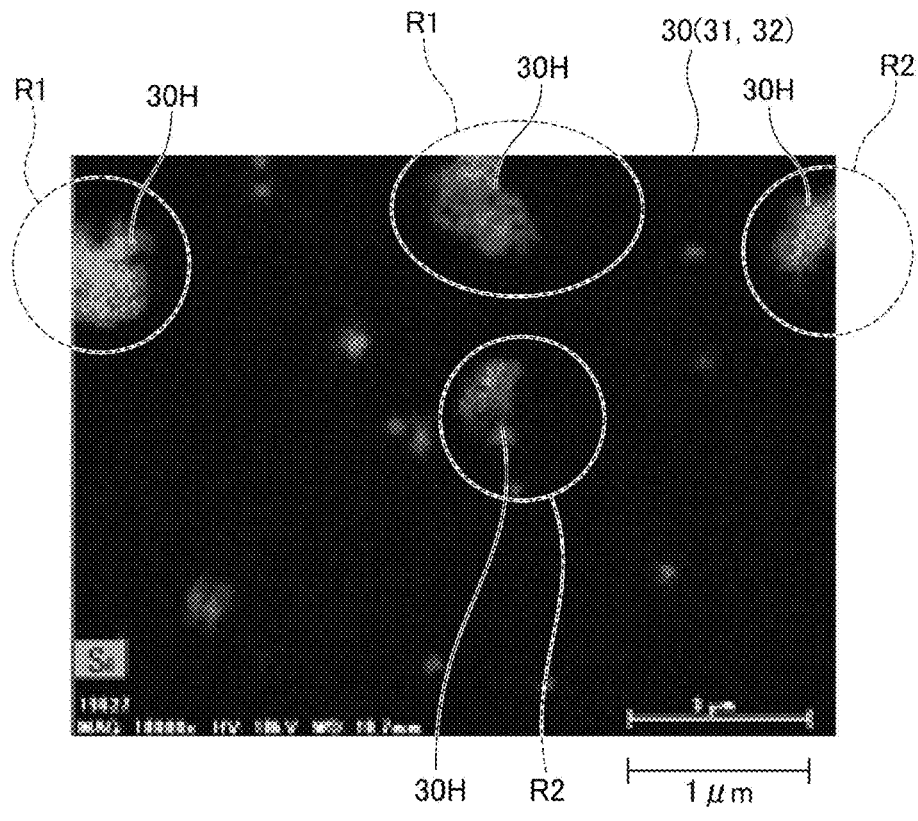
FIG. 7B is one example of an image of Si components in FIG. 7A.
Figure 7C:
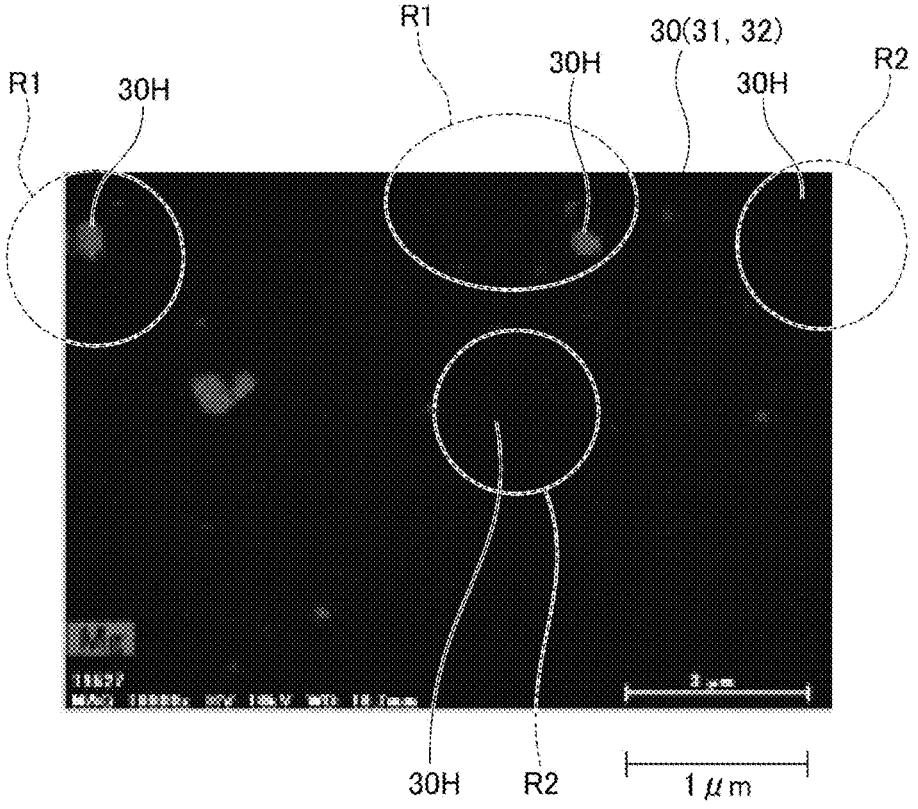
FIG. 7C is one example of an image of Mg components in FIG. 7A.

FIG. 7A is one example of an image of the inner electrode layer imaged by a SEM-EDX, FIG. 7B is one example of an image of Si components in FIG. 7A, and FIG. 7C is one example of an image of Mg components in FIG. 7A.

In each of the through holes 30H of the inner electrode layers 30, a portion of the dielectric layers 20 adjacent thereto is packed. Consequently, Si that is derived from the dielectric layers 20 segregates inside the through holes 30H. When electrically insulative Si thus segregates in the dielectric that is packed in the through holes 30H, insulation resistance at the through holes 30H can be increased. Consequently, concentration of an electric field can be reduced or prevented at the through holes 30H, and a decrease of the lifetime, in other words, the reliability of the multilayer ceramic capacitor 1 can be reduced or prevented.

It is preferable that Si segregate in the vicinity of the edges of the through holes 30H. Specifically, the concentration of Si at the edges of the through holes 30H is preferably higher than the concentration of Si at the centers of the through holes 30H. Consequently, the insulation resistance can be increased in the vicinity of the edges of the through holes 30H where concentrating of an electric field easily occurs. Consequently, concentration of an electric field can be reduced or prevented at the through holes 30H, and a decrease of the lifetime, in other words, the reliability of the multilayer ceramic capacitor 1 can be reduced or prevented.

For example, Mg that is derived from the dielectric layers 20 may additionally segregate inside the through holes 30H. In other words, among the plurality of through holes 30H, the through holes 30H in which Si segregates may include through holes in which Mg that is derived from the dielectric layers 20 additionally segregates. In the through holes 30H in which Si segregates, the percentage of the through holes 30H in which Mg additionally segregates is preferably less than or equal to about 20%, for example. Details will be described later.

Although not particularly limited, one example of a method of obtaining the percentage of the through holes 30H in which Si and Mg segregate is, for example, the following example in which a wavelength dispersive x-ray spectroscopy (WDX) or an energy dispersive x-ray spectroscopy (EDX) and a scanning electron microscope (SEM) or a transmission electron microscope (TEM) are used.

As described above, in the vicinity of the center in the stacking direction T of the multilayer body 10, the dielectric layers 20 are electrolytically peeled from a desired one of the inner electrode layers 30. A peeled portion in the stacking direction T of the multilayer body 10 is not limited thereto.

As described above, by using, for example, a SEM-EDX, three visual fields each with a size of, for example, about 30 μm×about 30 μm are imaged in the vicinity of the center of a plane of the desired inner electrode layer 30. Imaged portions in the plane of the inner electrode layer 30 and the sizes of the visual fields are not limited thereto.

In the images, the number of the through holes 30H in which Si segregates is calculated. Specifically, in FIGS. 7A and 7B, the number of the through holes 30H in which Si segregates as in a region R1 and a region R2 is calculated.

In the images, the number of the through holes 30H in which Si segregates and Mg additionally segregates is calculated. Specifically, in FIGS. 7A to 7C, the number of the through holes 30H in which Si segregates and Mg additionally segregates as in the region R1 is calculated.

In the above-described three visual fields, the percentage of the number of the through holes 30H in which Mg additionally segregates with respect to the number of the through holes 30H in which Si segregates is calculated. In other words, the percentage of the through holes 30H in the three visual fields of the desired inner electrode layer 30 is considered as the percentage of the through holes 30H of the plurality of inner electrode layers 30 of the multilayer ceramic capacitor 1.

Manufacturing Method

Next, one example of a method of manufacturing the multilayer ceramic capacitor 1 described above will be described. First, a dielectric sheet for the dielectric layers 20 and an electrically conductive paste for the inner electrode layers 30 are prepared. The dielectric sheet and the electrically conductive paste each include a binder and a solvent. Publicly known materials, for example, are usable as the binder and the solvent.

Next, an inner electrode pattern is formed on the dielectric sheet by applying the electrically conductive paste, for example, in a predetermined pattern on the dielectric sheet. Screen printing, gravure printing, or the like, for example, are usable as a method of forming the inner electrode pattern.

Next, a predetermined number of dielectric sheets for the second outer layer portion 102 and on each of which no inner electrode pattern is printed are stacked. A dielectric for the inner layer portion 100 and on which an inner electrode pattern is printed is sequentially stacked thereon. A predetermined number of dielectric sheets for the first outer layer portion 101 and on each of which no inner electrode pattern is printed are stacked thereon. Consequently, a multilayer sheet is produced.

Next, the multilayer sheet is pressed in the stacking direction by, for example, an isostatic press, thus producing a multilayer block. Next, the multilayer block is cut to a predetermined size to cut out a multilayer chip. At this time, corner portions and ridge portions of the multilayer chip are rounded by, for example, barrel polishing or the like. Next, the multilayer chip is fired, thus producing the multilayer body 10. Although depending on materials of the dielectric and the inner electrode, temperature for the firing is preferably, for example, equal to or greater than about 900° C. and less than or equal to about 1400° C.

At this time, by optimizing sintering of each of the inner electrode and the dielectric, the dielectric may be sintered after the inner electrode is sintered. As described above, the inner electrode layers 30 each include the plurality of through holes 30H, and, inside the through holes 30H, a portion of the dielectric layers 20 is packed and Si that is derived from the dielectric layers 20 segregates. Segregation of Si in the dielectric packed in the through holes 30H can increase the softening point of the dielectric. Consequently, formation of the through holes 30H that are large in the inner electrode can be reduced or prevented. In addition, the circularity of each of the through holes 30H can be increased.

In addition, while Mg that is derived from the dielectric layers 20 segregates inside the through holes 30H, as described above, it is preferable that, for example, in the through holes in which Si segregates, the percentage of the through holes in which Mg additionally segregates be less than or equal to about 20%. When Mg dissolves in Si, the above-described advantageous effect of Si increasing the softening point of the dielectric decreases. Therefore, segregation of Mg in the through holes 30H is preferably less than or equal to a predetermined amount.

In addition, Mg is an element that is blended in the dielectric layers 20 to accelerate grain growth of ceramic, and a larger dielectric constant can be ensured as the grain size of the ceramic increases. Therefore, segregation of Mg in the dielectric in the through holes 30H widens the through holes 30H of the inner electrode layers 30. Accordingly, segregation of Mg in the through holes 30H is preferably less than or equal to a predetermined amount. Consequently, a size increase of the through holes 30H in the inner electrode layers 30 can be reduced or prevented.

Next, an electrically conductive paste for the first base electrode layer 415 is applied to the first end surface LS1 by immersing the first end surface LS1 of the multilayer body 10 in the electrically conductive paste, which is an electrode material for the base electrode layer, by, for example, a dip method. Similarly, an electrically conductive paste for the second base electrode layer 425 is applied to the second end surface LS2 by immersing the second end surface LS2 of the multilayer body 10 in the electrically conductive paste, which is an electrode material for the base electrode layer, by, for example, the dip method. Thereafter, these electrically conductive pastes are fired, thus forming the first base electrode layer 415 and the second base electrode layer 425, which are fired layers. A temperature for the firing is preferably, for example, equal to or greater than about 600° C. and less than or equal to about 900° C.

As described above, the first base electrode layer 415 and the second base electrode layer 425 that are resin layers may be formed by application of an electrically conductive paste that includes electrically conductive grains and a heat-curable resin by an application method, and the first base electrode layer 415 and the second base electrode layer 425 that are thin films may be formed by a thin-film formation method such as, for example, a sputtering method or a vapor deposition method.

Thereafter, the first outer electrode 41 is formed by forming the first plating layer 416 on a surface of the first base electrode layer 415, and the second outer electrode 42 is formed by forming the second plating layer 426 on a surface of the second base electrode layer 425. Through the above steps, the above-described multilayer ceramic capacitor 1 is obtained.

Figure 8:
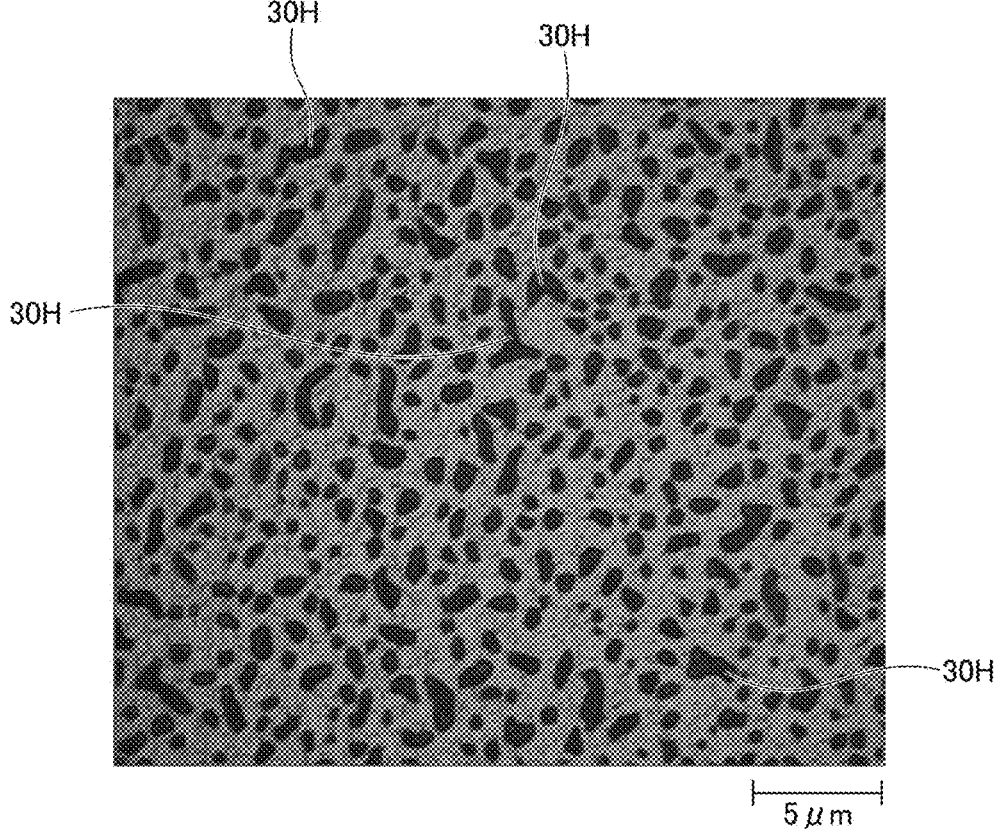
FIG. 8 is an enlarged view in which an inner electrode layer of a multilayer ceramic capacitor in a comparative example is viewed in a stacking direction.

As described above, the inventors of preferred embodiments of the present application have discovered that the lifetime of the multilayer ceramic capacitor 1 depends on the circularity of each of the through holes 30H of the inner electrode layers 30. Specifically, when, as illustrated in FIG. 8, the circularity of each of the through holes 30H is low, in other words, when the shape of each of the through holes 30H is a shape that has large irregularities, concentration of an electric field occurs at the large irregularities, and as a result, the lifetime, in other words, the reliability of the multilayer ceramic capacitor decreases. Meanwhile, when, as illustrated in FIG. 6, the circularity of each of the through holes 30H is high, in other words, when the shape of each of the through holes 30H is a shape with few or no irregularities, concentration of an electric field is reduced or prevented, and, as a result, a decrease of the lifetime, in other words, the reliability of the multilayer ceramic capacitor 1 is reduced or prevented.

Regarding this point, according to the multilayer ceramic capacitor 1 in the present preferred embodiment, the average circularity of the through holes 30H of the inner electrode layers 30 is, for example, equal to or greater than about 0.6. Consequently, concentration of an electric field can be reduced or prevented at the through holes 30H, and a decrease of the lifetime, in other words, the reliability of the multilayer ceramic capacitor 1 can be reduced or prevented.

Further, according to the multilayer ceramic capacitor 1 in the present preferred embodiment, the percentage of the through holes 30H with circularity equal to or greater than about 0.6 in the plurality of through holes 30H of the inner electrode layers 30 may be, for example, equal to or greater than about 60%. Further, in the plurality of through holes 30H of the inner electrode layers 30, the percentage of the through holes 30H with circularity equal to or greater than about 0.6 may be, for example, equal to or greater than 70%. Consequently, it is possible to further reduce or prevent concentration of an electric field at the through holes 30H and possible to further reduce or prevent a decrease of the lifetime, in other words, the reliability of the multilayer ceramic capacitor 1.

In addition, the inventors of preferred embodiments of the present application have discovered that the lifetime of the multilayer ceramic capacitor 1 depends on a component of the dielectric packed in the through holes 30H of the inner electrode layers 30. Specifically, when an electrically insulative substance that is derived from the dielectric layers 20 segregates in the dielectric packed in the through holes 30H, as illustrated in FIGS. 7A and 7B, concentration of an electric field is reduced or prevented, and as a result, a decrease of the lifetime, in other words, the reliability of the multilayer ceramic capacitor 1 is reduced or prevented.

Regarding this point, according to the multilayer ceramic capacitor 1 in the present preferred embodiment, a portion of the dielectric layers 20 is packed and Si that is derived from the dielectric layers 20 segregates inside the through holes 30H of the inner electrode layers 30. When electrically insulative Si thus segregates in the dielectric that is packed in the through holes 30H, insulation resistance at the through holes 30H can be increased. Consequently, concentration of an electric field can be reduced or prevented at the through holes 30H, and a decrease of the lifetime, in other words, the reliability of the multilayer ceramic capacitor 1 can be reduced or prevented.

Further, according to the multilayer ceramic capacitor 1 in the present preferred embodiment, the concentration of Si at the edges of the through holes 30H of the inner electrode layers 30 may be higher than the concentration of Si at the centers of the through holes 30H. Consequently, the insulation resistance can be increased in the vicinity of the edges of the through holes 30H where concentration of an electric field easily occurs. Consequently, concentration of an electric field can be reduced or prevented at the through holes 30H, and a decrease of the lifetime, in other words, the reliability of the multilayer ceramic capacitor 1 can be reduced or prevented.

Meanwhile, by optimizing sintering of each of the inner electrode and the dielectric in the manufacture of the multilayer ceramic capacitor 1 in the present preferred embodiment, the dielectric may be sintered after the inner electrode is sintered. As described above, segregation of Si in the dielectric packed in the through holes 30H of the inner electrode layers 30 can increase the softening point of this dielectric. Consequently, formation of the through holes 30H that are large in the inner electrode can be reduced or prevented. In addition, the circularity of each of the through holes 30H can be increased.

Meanwhile, Mg that is derived from the dielectric layers 20 additionally segregates inside the through holes 30H of the inner electrode layers 30. Regarding this point, according to the multilayer ceramic capacitor 1 in the present preferred embodiment, the percentage of the through holes 30H in which Mg additionally segregates in, among the plurality of through holes 30H of the inner electrode layers 30, the through holes 30H in which Si segregates may be, for example, less than or equal to about 20%. When Mg dissolves in Si, the above-described advantageous effect of Si increasing the softening point of the dielectric decreases. Therefore, segregation of Mg in the through holes 30H is preferably less than or equal to a predetermined amount.

In addition, Mg is an element that is blended in the dielectric layers 20 to accelerate grain growth of ceramic, and a larger dielectric constant can be ensured as the grain size of the ceramic increases. Therefore, segregation of Mg in the dielectric in the through holes 30H widens the through holes 30H of the inner electrode layers 30. Accordingly, segregation of Mg in the through holes 30H is preferably less than or equal to a predetermined amount. Consequently, a size increase of the through holes 30H in the inner electrode layers 30 can be reduced or prevented.

While example preferred embodiments of the present invention have been described above, the present invention is not limited to the above-described example preferred embodiments and can be variously changed or modified. For example, in the above-described preferred embodiments, an example in which the multilayer ceramic capacitor 1 in which the outer electrode 40 is provided at each of the end surfaces LS1 and LS2 of the multilayer body 10 is described. Features of the present invention are, however, not limited thereto, and the present invention is also applicable to, for example, a multilayer ceramic capacitor in which an outer electrode is provided at each of the side surfaces WS1 and WS2 of the multilayer body 10.

In addition, in the above-described preferred embodiments, a 2-terminal multilayer ceramic capacitor 1 that includes two outer electrodes is described as an example. Features of the present invention are, however, not limited thereto, and the present invention is also applicable to a multiple terminal multilayer ceramic capacitor that includes three or more outer electrodes. As an example of such a multiple terminal multilayer ceramic capacitor, a multilayer ceramic capacitor that reduces equivalent series inductance (ESL) is described. As such a multiple terminal multilayer ceramic capacitor, two modifications, including a 3-terminal multilayer ceramic capacitor and an 8-terminal multilayer ceramic capacitor, are presented below as examples.

Modification 1

Figure 9:
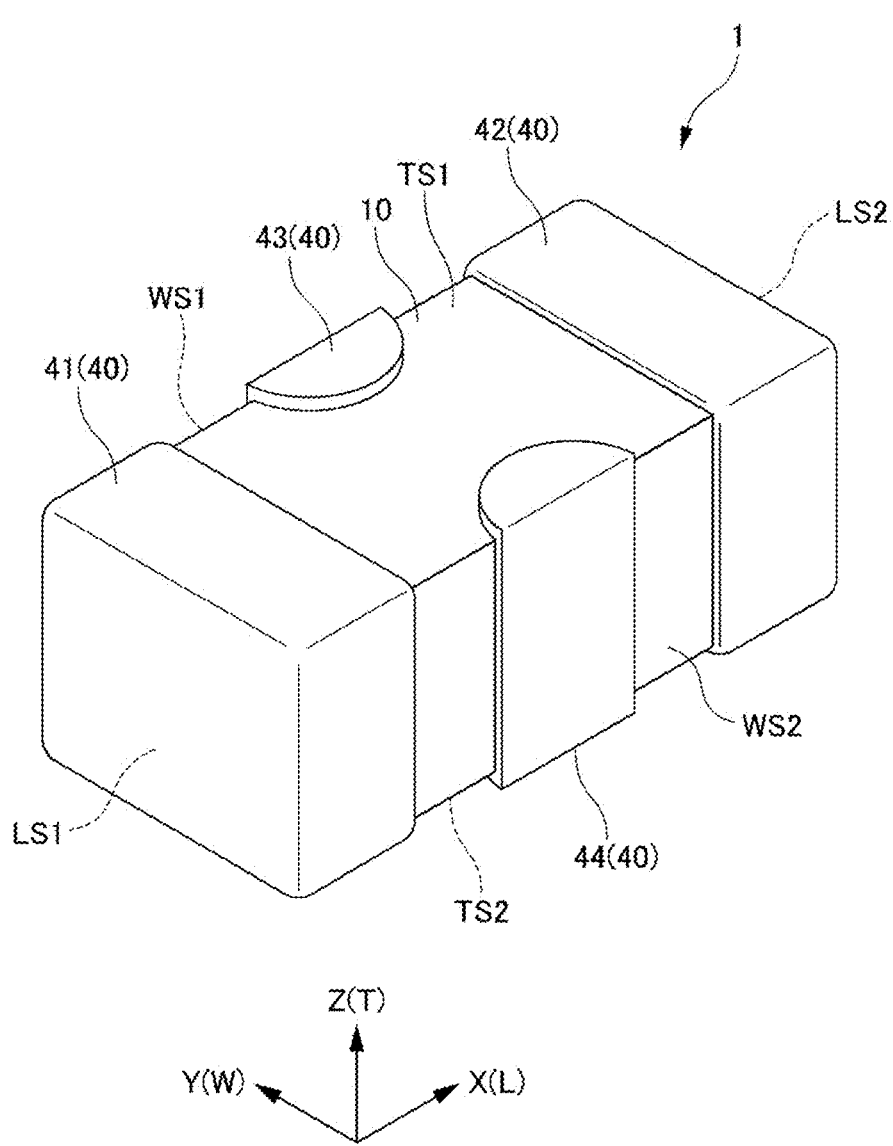
FIG. 9 is a perspective view illustrating a multilayer ceramic capacitor according to Modification 1 of a preferred embodiment of the present invention.
Figure 10:
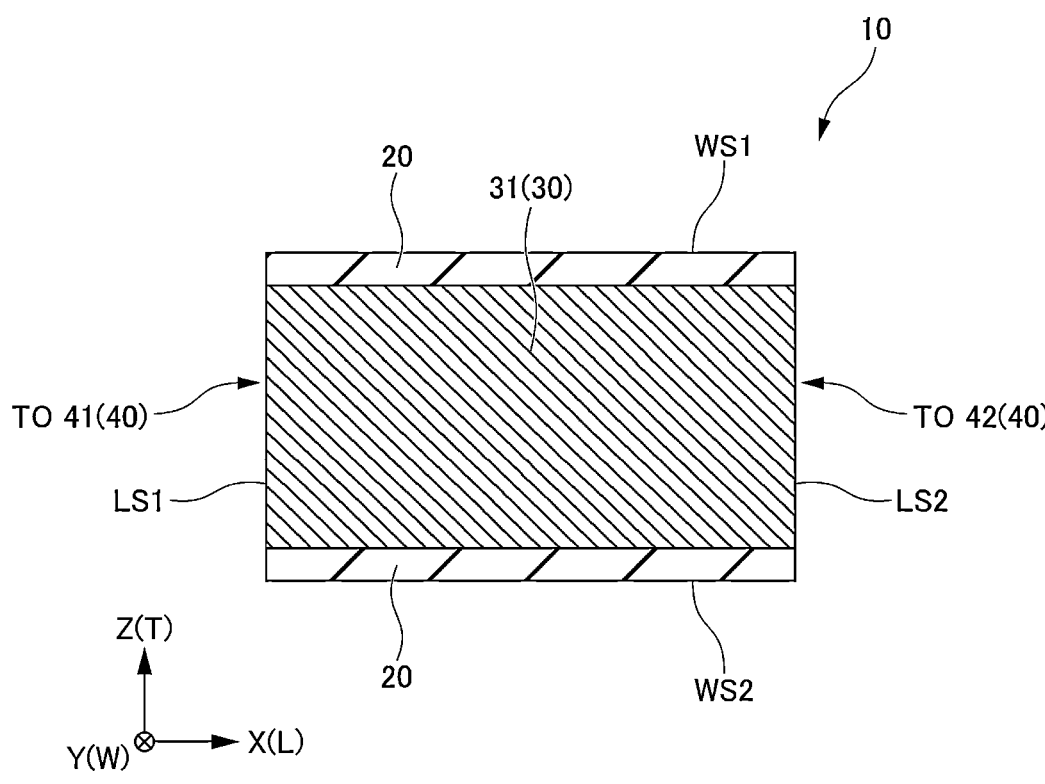
FIG. 10 is an LW sectional view of a multilayer body of the multilayer ceramic capacitor illustrated in FIG. 9, the LW sectional view corresponding to FIG. 4 and including a first inner electrode layer.
Figure 11:
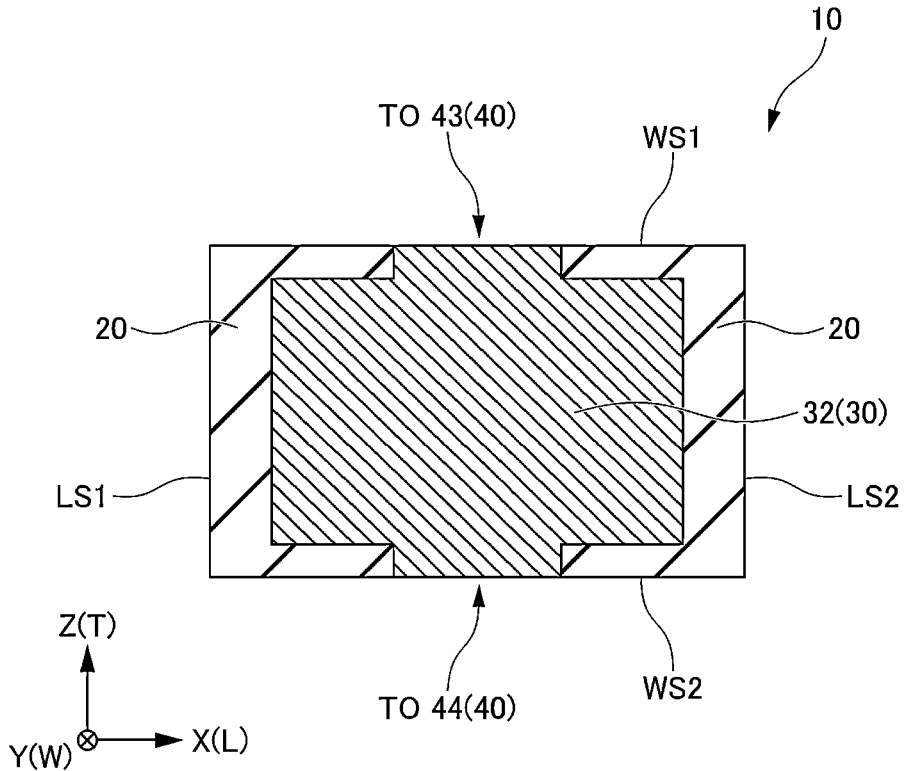
FIG. 11 is an LW sectional view of a multilayer body of the multilayer ceramic capacitor illustrated in FIG. 9, the LW sectional view corresponding to FIG. 5 and including a second inner electrode layer.

FIG. 9 is a perspective view illustrating a multilayer ceramic capacitor according to Modification 1 of a preferred embodiment of the present invention. FIG. 10 is an LW sectional view of a multilayer body of the multilayer ceramic capacitor illustrated in FIG. 9. The LW sectional view corresponds to FIG. 4 and includes a first inner electrode layer. FIG. 11 is an LW sectional view of a multilayer body of the multilayer ceramic capacitor illustrated in FIG. 9. The LW sectional view corresponds to FIG. 5 and includes a second inner electrode layer. The multilayer ceramic capacitor 1 in Modification 1 illustrated in FIG. 9 to FIG. 11 is a 3-terminal multilayer ceramic capacitor that reduces ESL.

The multilayer ceramic capacitor 1 in Modification 1 includes, as the outer electrode 40, the first outer electrode 41, the second outer electrode 42, a third outer electrode 43, and a fourth outer electrode 44 in the multilayer ceramic capacitor 1 illustrated in FIGS. 1 to 5.

The first outer electrode 41 is disposed at the first end surface LS1 of the multilayer body 10, and the second outer electrode 42 is disposed at the second end surface LS2 of the multilayer body 10. In addition, the third outer electrode 43 is disposed at the first side surface WS1 of the multilayer body 10, and the fourth outer electrode 44 is disposed at the second side surface WS2 of the multilayer body 10.

The first inner electrode layers 31 are exposed at the first end surface LS1 and the second end surface LS2 of the multilayer body 10 and are connected to the first outer electrode 41 and the second outer electrode 42. In addition, the second inner electrode layers 32 are exposed at the first side surface WS1 and the second side surface WS2 of the multilayer body 10 and are connected to the third outer electrode 43 and the fourth outer electrode 44.

Modification 2

Figure 12:
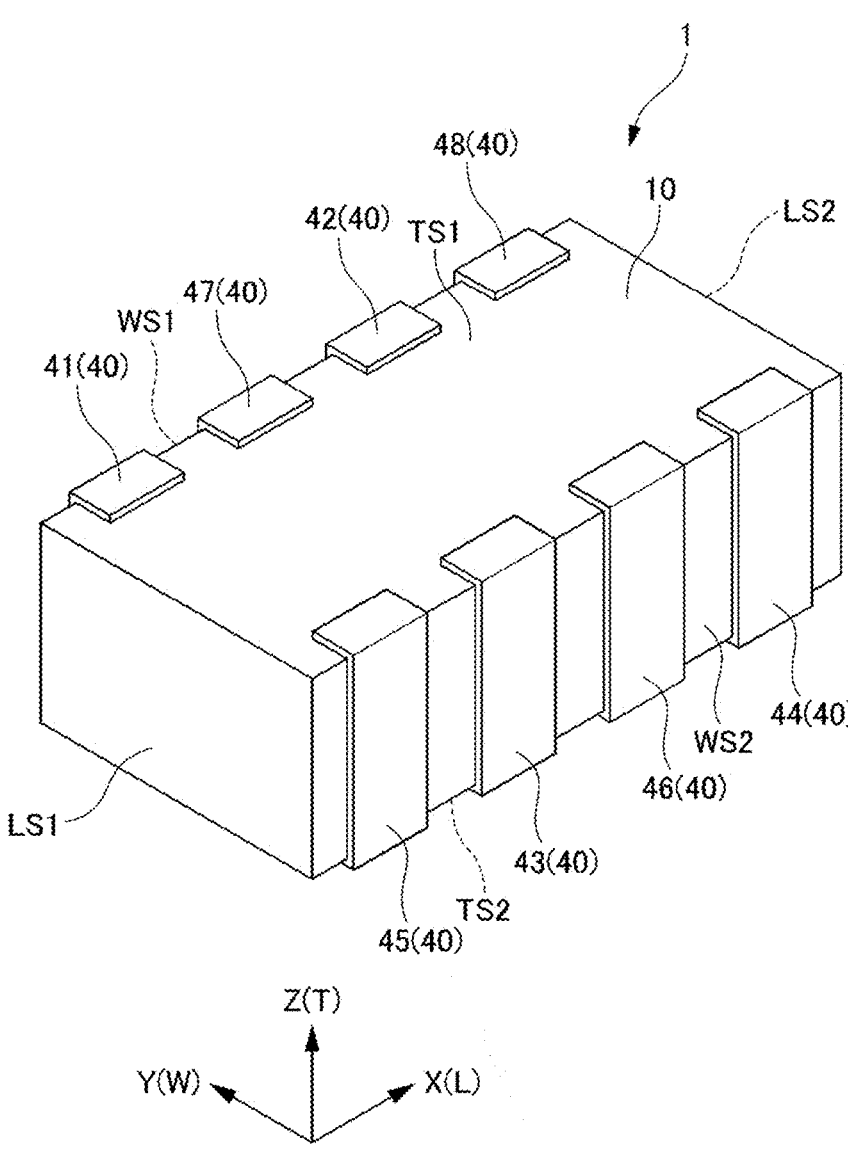
FIG. 12 is a perspective view illustrating a multilayer ceramic capacitor according to Modification 2 of a preferred embodiment of the present invention.
Figure 13:
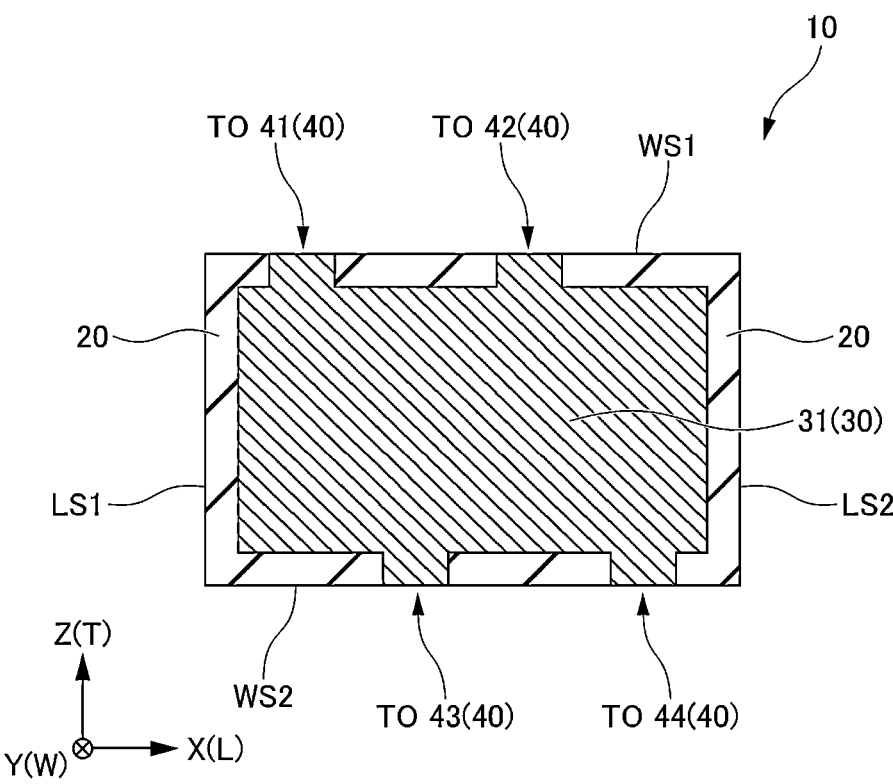
FIG. 13 is an LW sectional view of a multilayer body of the multilayer ceramic capacitor illustrated in FIG. 12, the LW sectional view corresponding to FIG. 4 and including a first inner electrode layer.
Figure 14:
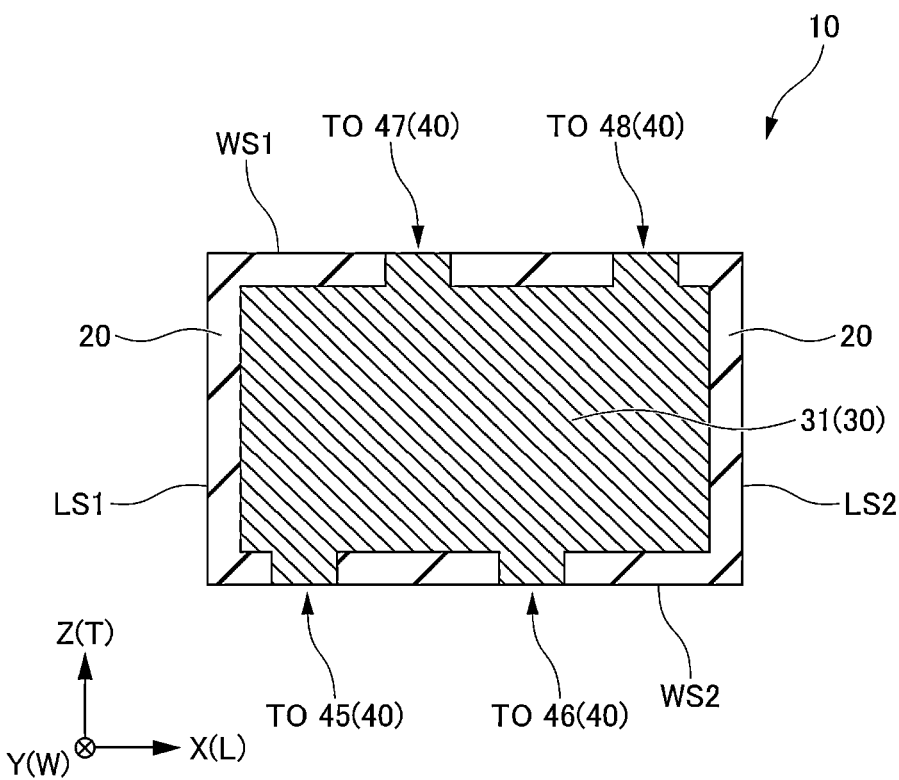
FIG. 14 is an LW sectional view of a multilayer body of the multilayer ceramic capacitor illustrated in FIG. 12, the LW sectional view corresponding to FIG. 5 and including a second inner electrode layer.

FIG. 12 is a perspective view illustrating a multilayer ceramic capacitor according to Modification 2 of a preferred embodiment of the present invention. FIG. 13 is an LW sectional view of a multilayer body of the multilayer ceramic capacitor illustrated in FIG. 12. The LW sectional view corresponds to FIG. 4 and includes a first inner electrode layer. FIG. 14 is an LW sectional view of a multilayer body of the multilayer ceramic capacitor illustrated in FIG. 12. The LW sectional view corresponds to FIG. 5 and includes a second inner electrode layer. The multilayer ceramic capacitor 1 in Modification 2 illustrated in FIG. 12 to FIG. 14 is an 8-terminal multilayer ceramic capacitor that reduces ESL.

The multilayer ceramic capacitor 1 in Modification 2 includes, as the outer electrode 40, the first outer electrode 41, the second outer electrode 42, the third outer electrode 43, the fourth outer electrode 44, a fifth outer electrode 45, a sixth outer electrode 46, a seventh outer electrode 47, and an eighth outer electrode 48 in the multilayer ceramic capacitor 1 illustrated in FIG. 1 to FIG. 5.

The first outer electrode 41, the seventh outer electrode 47, the third outer electrode 43, and the eighth outer electrode 48 are disposed at the first side surface WS1 of the multilayer body 10 in this order from the first end surface LS1 toward the second end surface LS2. In addition, the fifth outer electrode 45, the third outer electrode 43, the sixth outer electrode 46, and the fourth outer electrode 44 are disposed at the second side surface WS2 of the multilayer body 10 in this order from the first end surface LS1 toward the second end surface LS2.

The first inner electrode layers 31 are exposed at the first side surface WS1 and the second side surface WS2 of the multilayer body 10 and are connected to the first outer electrode 41, the second outer electrode 42, the third outer electrode 43, and the fourth outer electrode 44. In addition, the second inner electrode layers 32 are exposed at the first side surface WS1 and the second side surface WS2 of the multilayer body 10 and are connected to the fifth outer electrode 45, the sixth outer electrode 46, the seventh outer electrode 47, and the eighth outer electrode 48.

EXAMPLES

Hereinafter, the present invention will be described with reference to examples of preferred embodiments of the present invention. The present invention is, however, not limited to the following examples.

The multilayer ceramic capacitor in the above-described preferred embodiment illustrated in FIG. 1 to FIG. 5 was produced as each of Examples 1 to 17, and multilayer ceramic capacitors in Comparative examples 1 to 6 were also produced. The main configurations of the multilayer ceramic capacitors in Examples 1 to 17 and Comparative examples 1 to 6, in other words, the chip size LW of the multilayer ceramic capacitor, the material of the dielectric layers, the material of the inner electrode layers, the thickness T of the element (multilayer body) of the multilayer ceramic capacitor, and the thickness of each of the electrodes (inner electrode layers) are as shown in Table 1. Here, BT denotes Ba and Ti, BCT denotes Ba, Ti, and Ca, and CZ denotes Ca and Zr, in other words, a perovskite chemical compound.

Main features of the multilayer ceramic capacitors in Examples 1 to 17 and Comparative examples 1 to 6, in other words, the average circularity of through holes in the inner electrode layers, the existence percentage of the through holes with circularity is less than about 0.4, equal to or greater than about 0.4 and less than about 1.0, equal to or greater than about 1.0, and equal to or greater than about 3.0 in the inner electrode layers, and the existence percentage of the through holes in which Mg additionally segregates in, among the through holes of the inner electrode layers, the through holes in which Si segregates are as shown in Table 2.

The method of calculating the average circularity of the through holes is as described above in the example. That is, the method is as follows.

The dielectric layers were electrolytically peeled from a desired inner electrode layer in the vicinity of the center in the stacking direction of the multilayer body.

By using a metal microscope and a 100× objective lens, three visual fields each with, for example, a size of about 30 μm×about 30 μm were imaged in the vicinity of the center of a plane of the desired inner electrode layer.

The images were subjected to binarization image processing to be converted into a region of the inner electrode layers and a region of the through holes.

In the binarized images, the circularity of each of the through holes was calculated by the above-described formula, the circularity of all of the through holes was averaged in each of the visual fields, and average circularity was obtained by further averaging the circularity in the three visual fields.

The method of calculating the existence percentage of the through holes for each circularity is as described above in the example. That is, the method is as follows.

As described above, in the binarized images, the circularity of each of the through holes is calculated by the above-described formula.

The percentage of the number of the through holes with respect to the number of all of the through holes in the above-described three visual fields is calculated for each circularity.

The method of calculating the existence percentage of the through holes in which Mg additionally segregates in, among the through holes in the inner electrode layers, the through holes in which Si segregates is as described above in the example. That is, the method is as follows.

As described above, the dielectric layers are electrolytically peeled from a desired inner electrode layer in the vicinity of the center in the stacking direction of the multilayer body.

As described above, by using the SEM-EDX, three visual fields each with, for example, a size of about 30 μm×about 30 μm are imaged in the vicinity of the center of a plane of the desired inner electrode layer.

In the images, twenty through holes in which Si segregates are calculated.

In the images, the number of the through holes in which Mg additionally segregates in the twenty through holes in which Si segregates is calculated.

In the above-described three visual fields, the percentage of the number of the through holes in which Mg additionally segregates with respect to the twenty through holes in which Si segregates is calculated.

Evaluation

As a reliability test of each of the multilayer ceramic capacitors in the examples and the comparative examples, a HALT (Highly Accelerated Limit Test) was performed, for example.

The HALT is a test in which stresses, such as temperature and vibration that exceed those in specifications, are applied to a test object to determine an operation limit and/or a fracture limit, in other words, an operation margin and/or a fracture margin with respect to those in the specifications. The test is an acceleration test and/or a fracture test. In the HALT, margins with respect to those in the specifications, in other words, reliability can be tested in a short period of time.

Conditions of the HALT are as follows.

Temperature about 150° C., Voltage about 30 V

As evaluation results of the HALT, 3-stage judgement based on fractured time (Mean Time To Failure: MTTF) is shown in Table 2. As the judgement value of "fractured", 100 kΩ or less is set as insulation resistance between terminals. In the three-stage judgement, it is judged as A when MTTF is equal to or greater than 10 hours, as B when MTTF is equal to or greater than about 5 hours and less than about 10 hours, and as C when MTTF is less than about 5 hours.

TABLE 1

| | Chip Size LW [mm] | Dielectric Material | Electrode Material | Element Thickness [mm] | Electrode Thickness [μm] |
|---|---|---|---|---|---|
| Example 1 | 0402 | BT | Ni | 0.50 | 0.35 |
| Example 2 | 0402 | BT | Ni | 0.50 | 0.35 |
| Example 3 | 0402 | BT | Ni | 0.50 | 0.35 |
| Example 4 | 0402 | BT | Ni | 0.50 | 0.35 |
| Comparative Example 1 | 0402 | BT | Ni | 0.50 | 0.35 |
| Example 5 | 0402 | BCT | Ni | 0.50 | 0.35 |
| Example 6 | 0402 | BT | Ni | 1.6 | 0.55 |
| Example 7 | 0402 | BT | Ni | 1.6 | 0.55 |
| Example 8 | 0402 | BT | Ni | 1.6 | 0.55 |
| Comparative Example 2 | 0402 | BT | Ni | 1.6 | 0.55 |
| Example 9 | 1005 | BT | Ni | 1.7 | 0.6 |
| Example 10 | 1005 | BT | Ni | 1.7 | 0.6 |
| Comparative Example 3 | 1005 | BT | Ni | 1.7 | 0.6 |
| Example 11 | 2012 | BT | Ni | 1.9 | 0.63 |
| Example 12 | 2012 | BT | Ni | 1.9 | 0.63 |
| Comparative Example 4 | 2012 | BT | Ni | 1.9 | 0.63 |
| Example 13 | 3225 | BT | Ni | 2.0 | 0.7 |
| Example 14 | 3225 | BT | Ni | 2.0 | 0.7 |
| Example 15 | 3225 | BT | Ni | 2.0 | 0.7 |
| Comparative Example 5 | 3225 | BT | Ni | 2.0 | 0.7 |
| Example 16 | 0402 | CZ | Ni | 4 | 1.8 |
| Example 17 | 0402 | CZ | Ni | 4 | 1.8 |
| Comparative Example 6 | 0402 | CZ | Ni | 4 | 1.8 |

TABLE 2

| | Average Circularity | HALT Judgement | Circularity less than 0.4 Existence Percentage | Circularity 0.4 to 1.0 Existence Percentage | Circularity 1.0 or more Existence Percentage | Circularity 3.0 or more Existence Percentage | Si, Mg Existence Percentage |
|---|---|---|---|---|---|---|---|
| Example 1 | 0.85 | A | 5% | 20% | 75% | 0% | 0% |
| Example 2 | 0.75 | A | 4% | 21% | 72% | 3% | 0% |
| Example 3 | 0.76 | B | 5% | 18% | 75% | 2% | 5% |
| Example 4 | 0.65 | B | 6% | 20% | 65% | 10% | 10% |
| Comparative Example 1 | 0.50 | C | 4% | 20% | 60% | 15% | 25% |
| Example 5 | 0.65 | A | 5% | 20% | 75% | 0% | 0% |
| Example 6 | 0.71 | A | 41% | 53% | 6% | 0% | 0% |
| Example 7 | 0.68 | B | 39% | 53% | 8% | 0% | 5% |
| Example 8 | 0.63 | A | 39% | 51% | 10% | 0% | 0% |
| Comparative Example 2 | 0.48 | C | 35% | 54% | 11% | 0% | 30% |
| Example 9 | 0.83 | A | 49% | 41% | 10% | 0% | 0% |
| Example 10 | 0.61 | A | 46% | 44% | 10% | 0% | 0% |
| Comparative Example 3 | 0.50 | C | 45% | 45% | 10% | 0% | 25% |
| Example 11 | 0.89 | A | 48% | 49% | 3% | 0% | 0% |
| Example 12 | 0.60 | A | 48% | 50% | 2% | 0% | 0% |
| Comparative Example 4 | 0.44 | C | 47% | 50% | 3% | 0% | 35% |
| Example 13 | 0.89 | A | 56% | 34% | 10% | 0% | 0% |
| Example 14 | 0.88 | B | 54% | 36% | 10% | 0% | 5% |
| Example 15 | 0.65 | A | 51% | 39% | 10% | 0% | 0% |
| Comparative Example 5 | 0.50 | C | 48% | 41% | 10% | 0% | 45% |
| Example 16 | 0.85 | A | 88% | 12% | 0% | 0% | 0% |
| Example 17 | 0.67 | A | 80% | 20% | 0% | 0% | 0% |
| Comparative Example 6 | 0.50 | C | 78% | 22% | 0% | 0% | 40% |

According to Table 2, the following is discovered.

A decrease of the lifetime, in other words, the reliability of the multilayer ceramic capacitor can be reduced or prevented when the average circularity of the through holes of the inner electrode layer is, for example, equal to or greater than about 0.6.

A decrease of the lifetime, in other words, the reliability of the multilayer ceramic capacitor can be further reduced or prevented when the percentage of through holes with circularity equal to or greater than 0.6 is, for example, equal to or greater than about 60%, and preferably equal to or greater than about 70% in a plurality of through holes of the inner electrode layer.

A decrease of the lifetime, in other words, the reliability of the multilayer ceramic capacitor can be reduced or prevented when the percentage of through holes in which Mg additionally segregates with respect to the through holes 30H in which Si segregates is, for example, less than or equal to about 20%.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a plurality of dielectric layers and a plurality of inner electrode layers being stacked and each made of a ceramic material; wherein
each of the plurality of inner electrode layers includes a plurality of through holes;
an average circularity of the plurality of through holes is equal to or greater than 0.6;

at least some of the plurality of through holes include Si; and
a concentration of Si at edges of the through holes is higher than a concentration of Si at centers of the through holes.

2. The multilayer ceramic capacitor according to claim 1, wherein, in the plurality of through holes, a percentage of through holes with circularity equal to or greater than 0.6 is equal to or greater than about 60%.

3. The multilayer ceramic capacitor according to claim 2, wherein, in the plurality of through holes, a percentage of through holes with circularity equal to or greater than 0.6 is equal to or greater than about 70%.

4. The multilayer ceramic capacitor according to claim 1, wherein
the plurality of dielectric layer and the plurality of inner electrode layer define a multilayer body;
the multilayer body includes an inner layer portion and first and second outer layer portions respectively provided on opposite sides of the inner layer portion; and
each of the first and second outer layer portions includes a portion of the plurality of dielectric layers.

5. The multilayer ceramic capacitor according to claim 4, wherein each of the first and second outer layer portions defines and functions as a protective layer of the inner layer portion.

6. The multilayer ceramic capacitor according to claim 4, wherein the multilayer body has a dimension a length direction equal to or greater than about 0.1 mm and less than or equal to about 32 mm, a dimension in a width direction equal to or greater than about 0.05 mm and less than or equal to about 25 mm, and a dimension in a stacking direction equal to or greater than about 0.05 mm and less than or equal to about 32 mm.

7. The multilayer ceramic capacitor according to claim 4, wherein the multilayer body has a dimension a length direction equal to or greater than about 0.1 mm and less than or equal to about 1.2 mm, a dimension in a width direction equal to or greater than about 0.1 mm and less than or equal to about 0.7 mm, and a dimension in a stacking direction equal to or greater than about 0.1 mm and less than or equal to about 0.7 mm.

8. The multilayer ceramic capacitor according to claim 4, wherein the multilayer body has a dimension a length direction equal to or greater than about 0.2 mm and less than or equal to about 0.5 mm, a dimension in a width direction equal to or greater than about 0.1 mm and less than or equal to about 0.3 mm, and a dimension in a stacking direction equal to or greater than about 0.1 mm and less than or equal to about 0.3 mm.

9. The multilayer ceramic capacitor according to claim 1, wherein each of the plurality of dielectric layers includes $BaTiO_3$, $CaTiO_3$, $SrTiO_3$, or $CaZrO_3$ as a primary component.

10. The multilayer ceramic capacitor according to claim 9, wherein each of the plurality of dielectric layers includes a Mn chemical compound, a Fe chemical compound, a Cr chemical compound, a Co chemical compound, a Ni chemical compound as a secondary component.

11. The multilayer ceramic capacitor according to claim 1, wherein a thickness of each of the plurality of dielectric layers is about 0.2 μm and less than or equal to about 1.0 μm.

12. The multilayer ceramic capacitor according to claim 1, wherein a thickness of each of the plurality of dielectric layers is about 0.3 μm and less than or equal to about 0.5 μm.

13. The multilayer ceramic capacitor according to claim 1, wherein a number of the plurality of dielectric layers is equal to or greater than 15 and less than or equal to 700.

14. The multilayer ceramic capacitor according to claim 1, wherein each of the plurality of inner electrode layers includes Ni as a primary component.

15. The multilayer ceramic capacitor according to claim 1, wherein each of the plurality of inner electrode layers includes at least one of Cu, Ag, Pd, or Au, or alloys including a Ag—Pd alloy.

16. The multilayer ceramic capacitor according to claim 1, wherein Sn is mixed as a solid in a portion of each of the plurality of inner electrode layers.

17. The multilayer ceramic capacitor according to claim 1, wherein a thickness of each of the plurality of inner electrode layers is equal to or greater than about 0.2 μm and less than or equal to about 2.0 μm.

18. The multilayer ceramic capacitor according to claim 1, wherein a number of the plurality of inner electrode layers is equal to or greater than 15 and less than or equal to 700.

19. The multilayer ceramic capacitor according to claim 1, wherein among the through holes exhibiting Si segregation, a percentage of the through holes in which Mg segregates is less than or equal to 20%.

* * * * *